Patented June 14, 1949

2,473,016

UNITED STATES PATENT OFFICE 2,473,016

METHOD OF REDUCING CUT-GROWTH RATE OF RUBBERLIKE BUTADIENE-STYRENE COPOLYMER

Arnold R. Davis, Riverside, Conn., assignor to American Cyanamid Company, New York, N. Y., a corporation of Maine No Drawing. Application January 29, 1945, Serial No. 575,191

3 Claims. (Cl. 260—41.5)

This invention relates to the vulcanizing of synthetic rubber-like materials. More particularly, the invention relates to an improved process of vulcanizing synthetic rubbers of the butadiene-styrene copolymer type, whereby products of decreased brittleness and exhibiting a remarkably low cut-rate growth are obtained.

In the fabrication of various articles such as tires, footwear and the like from synthetic rubber-like materials, a problem occurs which is not encountered when using natural rubber in a similar manner. This problem is that of the rate at which a small cut will grow as the fabricated rubber-like composition is flexed. In the case of vehicle tires particularly, the problem is further aggravated by the fact that in use the articles are subjected to the same flexing which induces the growth of any cut which may be accidentally caused.

It is, therefore, a principal object of the present invention to produce a rubber composition which when fabricated and/or vulcanized will be subject to a minimum of difficulty with cut growth. At the same time, it is a further object of the invention to obtain rubber-like compositions which, in addition to a low cut growth rate, are less subject to brittleness after vulcanization than is true of currently-available materials of similar types.

In general, the accomplishment of the desired objects of the present invention are obtained by incorporating in the rubber-like composition a small amount of lime, magnesia or salts thereof with weak acids. It has been found that the addition of very small amounts of these materials, amounting to from about 0.1 to 0.5% by weight of the butadiene-styrene copolymer in the composition, the rate at which a cut increases in length or depth as the vulcanized composition is flexed may be reduced from a third to a half.

The practice of the present invention is relatively simple, having the advantage that no alterations in the usual procedures of compounding, fabricating and vulcanization need be made. The usual fillers, strengtheners, softening agents and organic accelerators are used. There is no required alteration in the time-temperature cycle during vulcanization. The only change required is the simple addition of the calcium or magnesium containing materials. These are added very simply as an additional compounding ingredient in the normal preparation of the materials.

In this respect, it should be noted that the present invention is not related in any way to the very old practice of accelerating the vulcanization of rubber by adding, in addition to sulfur, a very large quantity such as 10 to 15% or more of magnesia or the like, where the MgO is used as an auxiliary accelerator in ratios of 1:2 or more with other accelerators. In such a case, the magnesia is present as an accelerator per se and is required in large amounts, so large in many cases as to be a very appreciable item when compared with the other compounded ingredients. Further, such materials in such large amounts are undesirable because of their effect on the hysteresis properties.

In the present case, the acceleration is provided by the usual organic accelerators such as mercaptobenzothiazole, its derivatives and other analogous products which are common and well known in the art. The lime and magnesium compounds are added in what are in effect catalytic amounts. The exact reason for their effect on the brittleness and cut-rate growth of the finished product is not known. As little as about 0.1% by weight of the rubber-like copolymer produces a beneficial effect. More than about 0.5 to 0.6% produces no appreciable additional improvement and is therefore not required. This amount is small enough so that considerations of hysteresis are negligible.

The invention will be described in greater particularity in conjunction with the following examples which are intended to be illustrative only and not by way of limitation. All parts are by weight unless otherwise noted. Where "aging" of the samples is referred to, a 48 hour storage treatment in an oven at 100° C. is indicated unless otherwise specified.

EXAMPLE 1

Compounds A and B were prepared having the formulations indicated in Table I. It will be noted that the two formulations are identical except that compound B contains an additional ingredient amounting to 0.15 pound of light-calcined magnesia. As shown in Table I, this small amount of material has no adverse effect on the setup tests as determined by the "Y" value on a Williams plastometer. The hardness of the material is somewhat better after being cured than when the magnesia is not present and the torsional hysteresis is not appreciably altered. However, the cut-rate growth on both the aged and unaged samples has been decreased more than 30%. In Table I and the succeeding tables, the following symbols are used to represent the various indicated accelerators:

MBT=mercaptobenzothiazole
OMBT=benzothiazyl disulfide
DOTG=diorthotolyl guanidine
AAC=a blend of mercaptobenzothiazole and the adduct of diphenyl guanidine-zinc chloride.

Table I

| | Compounds | |
|---|---|---|
| | A | B |
| GR-S | 100 | 100 |
| EPC Black | 50 | 50 |
| Zinc Oxide | 5 | 5 |
| Sulfur | 2 | 2 |
| Softener (Petroleum Hydrocarbon) | 10 | 10 |
| OMBT | 0.495 | 0.495 |
| DOTG | 0.705 | 0.705 |
| MgO (light calcined) | | 0.15 |
| Set-up Tests | Williams 3 min. "Y" at 100° C. inches | |
| No Heat | .116 | .116 |
| After 2.5 hrs. in Boiling H₂O | .140 | .140 |
| Per cent Change | +21 | +21 |

SHORE HARDNESS

| | (0.5–30 in. dwell) | |
|---|---|---|
| Minutes Cure at 141° C.: | | |
| 30 | 62–54 | 59–50 |
| 60 | 65–58 | 62–54 |
| 90 | 66–58 | 63–55 |

TORSIONAL HYSTERESIS

| | "K" at 280° F. | |
|---|---|---|
| Minutes Cure at 141° C.: | | |
| 30 | .152 | .159 |
| 60 | .141 | .145 |
| 90 | .145 | .151 |

CUT GROWTH RATE

| | Mils/1000 flexes | |
|---|---|---|
| 60 minute cure, unaged | 17 | 12 |
| Aged 24 hrs. at 100° C | 35 | 25 |

The following table (Table II) shows that the sample containing the 0.15 part of light-calcined magnesia per 100 parts of butadiene-styrene copolymer produces vulcanizates which have higher elongation both before and after aging.

Table II

| Cure | Mod.[1] at 200% | Mod. at 300% | Tensile[1] Strength | Elong., Per cent | Set,[2] Per cent |
|---|---|---|---|---|---|
| 30 min. at 141° C.: | | | | | |
| Compound A } Unaged | 350 | 700 | 2,860 | 735 | 36 |
| Compound B } Unaged | 265 | 515 | 2,550 | 805 | 39 |
| Compound A } Aged | 1,025 | | 2,700 | 410 | |
| Compound B } Aged | 775 | | 2,625 | 495 | |
| 60 min. at 141° C.: | | | | | |
| Compound A } Unaged | 525 | 1,060 | 2,860 | 560 | 22 |
| Compound B } Unaged | 400 | 825 | 3,090 | 690 | 32 |
| Compound A } Aged | 1,060 | | 2,750 | 400 | |
| Compound B } Aged | 840 | | 2,685 | 470 | |
| 90 min. at 141° C.: | | | | | |
| Compound A } Unaged | 560 | 1,160 | 3,075 | 560 | 19 |
| Compound B } Unaged | 415 | 875 | 3,265 | 675 | 30 |
| Compound A } Aged | 1,000 | | 2,750 | 415 | |
| Compound B } Aged | 825 | | 2,915 | 500 | |

[1] Modulus and Tensile in pounds/sq. in.
[2] Set at break 2 min. after break.

EXAMPLE 2

Similar compositions were prepared to those in Example 1, but using 0.5 part per 100 of hydrated lime. The formulations and physical properties are shown in Table III and the tensile strength tests in Table IV.

Table III

| | Compounds | |
|---|---|---|
| | C | D |
| GR-S | 100 | 100 |
| EPC Black | 50 | 50 |
| Zinc Oxide | 5.0 | 5.0 |
| Coal Tar Softener | 5.0 | 5.0 |
| Sulfur | 2.0 | 2.0 |
| Hydrated Lime | | 0.5 |
| AAC | 0.95 | 0.95 |
| Set-up Tests | Williams 3 min. "Y" at 100° C. inches. | |
| No Heat | .148 | .149 |
| After 2.5 hrs. in Boiling H₂O | .186 | .190 |
| Per Cent Change | +25.6 | +27.4 |

SHORE HARDNESS

| Minutes Cure at 141° C.: | | |
|---|---|---|
| 30 | 50 | 50 |
| 60 | 58 | 53 |
| 90 | 62 | 56 |

CUT GROWTH RATE

| | Mils/Kilocycle | |
|---|---|---|
| 60 minute Cure Before Aging | 30 | 20 |
| After 24 hrs. at 100° C | 72 | 38 |

TEAR RESISTANCE

| | lb./in. | |
|---|---|---|
| 60 minute Cure, after 48 hrs. at 100° C | 103 | 142 |

TORSIONAL HYSTERESIS

| | "K" at 280° F. | |
|---|---|---|
| 60 minute Cure, Unaged | .185 | .180 |

Table IV

| Cure | Mod.[1] at 200% | Mod.[1] at 300% | +Ten. | Elong., Per Cent |
|---|---|---|---|---|
| 30 min. at 141° C.: | | | | |
| Compound C } Unaged | 240 | 485 | 1,870 | 690 |
| Compound D } | 205 | 355 | 1,540 | 740 |
| Compound C } Aged | 1,095 | --- | 2,585 | 370 |
| Compound D } | 910 | --- | 2,590 | 415 |
| 60 min. at 141° C.: | | | | |
| Compound C } Unaged | 505 | 1,030 | 2,660 | 550 |
| Compound D } | 390 | 800 | 2,510 | 610 |
| Compound C } Aged | 1,400 | --- | 2,560 | 305 |
| Compound D } | 1,050 | --- | 2,550 | 380 |
| 90 min. at 141° C.: | | | | |
| Compound C } Unaged | 635 | 1,265 | 2,880 | 505 |
| Compound D } | 420 | 870 | 2,675 | 585 |
| Compound C } Aged | 1,330 | --- | 2,710 | 325 |
| Compound D } | 1,010 | --- | 1,815 | 410 |

[1] Modulus and Tensile in lbs./sq. in.

EXAMPLE 3

Example 2 was repeated using 0.5 part per 100 of magnesia and using several different organic accelerators. The formulation and physical properties are shown in the following Tables V and VI.

Table V

| | Compounds | | | |
|---|---|---|---|---|
| | E | F | G | H |
| GR-S | 100 | 100 | 100 | 100 |
| EPC Black | 50 | 50 | 50 | 50 |
| Coal Tar Softener | 5.0 | 5.0 | 5.0 | 5.0 |
| Zinc Oxide | 5.0 | 5.0 | 5.0 | 5.0 |
| Sulfur | 2.0 | 2.0 | 2.0 | 2.0 |
| Light calcined magnesia | --- | 0.5 | --- | 0.5 |
| AAC | 0.95 | 0.95 | --- | --- |
| MBT | --- | --- | 1.5 | 1.5 |
| Set-up Tests | Williams 3 min. "Y" at 100° C. | | | |
| inches | | | | |
| No Heat | .155 | .155 | .155 | .157 |
| After 2.5 hrs. in Boiling H₂O | .186 | .201 | .202 | .218 |
| Per Cent Change | +20 | +29.6 | +30.3 | +38.9 |

SHORE HARDNESS

| | Compounds | | | |
|---|---|---|---|---|
| | E | F | G | H |
| Minutes Cure at 141° C.: | | | | |
| 30 | 50+ | 45 | 48+ | 48 |
| 60 | 60+ | 55− | 60 | 55 |
| 90 | 61 | 55+ | 61− | 56 |
| 120 | 61+ | 56 | 61 | 56+ |

CUT GROWTH RATE

| | mils/kilocycle | | | |
|---|---|---|---|---|
| 60 Minute Cure, Unaged | 28 | 21 | 27 | 20 |
| Aged 24 hrs. at 100° C | 47 | 30 | 63 | 46 |

Per Cent Rebound

| | | | | |
|---|---|---|---|---|
| 60 Minute Cure at 141° C | 38 | 38 | 38 | 39 |

TORSIONAL HYSTERESIS

| | "K" at 280° F. | | | |
|---|---|---|---|---|
| 60 Minute Cure at 141° C | .167 | .229 | .162 | .197 |

Table VI

| Cure | Mod.[1] at 200% | Mod.[1] at 300% | Tensile Strength | Elong., percent |
|---|---|---|---|---|
| 30 min. at 141° C.: | | | | |
| Compound E } Unaged | +240 | +455 | +1930 | 745 |
| Compound F } | 165 | 255 | 1065 | 780 |
| Compound G } | 210 | 435 | 1780 | 735 |
| Compound H } | 195 | 340 | 1565 | 750 |
| Compound E } Aged | 1,085 | --- | 2,450 | 370 |
| Compound F } | 675 | --- | 2,570 | 530 |
| Compound G } | 1,185 | --- | 2,340 | 320 |
| Compound H } | 1,035 | --- | 2,130 | 320 |
| 60 min. at 141° C.: | | | | |
| Compound E } Unaged | 535 | 1,115 | 2,830 | 550 |
| Compound F } | 285 | 615 | 2,165 | 670 |
| Compound G } | 465 | 1,025 | 2,875 | 580 |
| Compound H } | 355 | 765 | 2,630 | 640 |
| Compound E } Aged | 1,390 | --- | 2,530 | 300 |
| Compound F } | 845 | --- | 2,695 | 465 |
| Compound G } | 1,505 | --- | 2,255 | 265 |
| Compound H } | 1,265 | --- | 2,230 | 290 |
| 90 min. at 141° C.: | | | | |
| Compound E } Unaged | 670 | 1,320 | 2,780 | 485 |
| Compound F } | 365 | 755 | 2,455 | 640 |
| Compound G } | 690 | 1,355 | 2,605 | 470 |
| Compound H } | 445 | 915 | 2,420 | 535 |
| Compound E } Aged | 1,320 | --- | 2,300 | 285 |
| Compound F } | 920 | --- | 2,610 | 425 |
| Compound G } | 1,505 | --- | 2,460 | 280 |
| Compound H } | 1,240 | --- | 2,435 | 315 |
| 120 min. at 141° C.: | | | | |
| Compound E } Unaged | 730 | 1,420 | 2,865 | 470 |
| Compound F } | 380 | 835 | 2,475 | 605 |
| Compound G } | 765 | 1,485 | 2,770 | 460 |
| Compound H } | 465 | 1,030 | 2,920 | 580 |
| Compound E } Aged | 1,325 | --- | 2,540 | 310 |
| Compound F } | 955 | --- | 2,770 | 440 |
| Compound G } | 1,515 | --- | 2,415 | 275 |
| Compound H } | 1,155 | --- | 2,350 | 320 |

[1] Modulus and Tensile in lbs./sq. in.

Commonly in the formulation of rubber compounds of these types, weakly acidic ingredients of high molecular weight and of varying degrees of unsaturation have been used as softeners. Such materials include, for example, rosin, fatty acids such as oleic acid, linoleic acid, stearic acid and the like and naphthenic acids. They have also been employed in the form of their zinc salts and less commonly as their copper salts. In accordance with the present invention, it has been found that if these materials are used as their calcium or magnesium derivatives the beneficial effect of the latter is also obtained, not only on the cut-rate growth but on the brittleness and tensile strength which is particularly evident after aging.

EXAMPLE 4

Use of these calcium and magnesium salts of several weak acids is listed in the following Table VII, showing various formations and physical properties resulting therefrom, a standard using stearic acid per se is also shown.

Table VII

|  | Compounds | | |
|---|---|---|---|
|  | I | J | K |
| GR-S | 100 | 100 | 100 |
| EPC Black | 50 | 50 | 50 |
| Zinc Oxide | 5 | 5 | 5 |
| Sulfur | 2 | 2 | 2 |
| Softener (Petroleum Hydrocarbon) | 8 | 8 | 8 |
| OMBT | 0.495 | 0.495 | 0.495 |
| DOTG | 0.705 | 0.705 | 0.705 |
| Stearic Acid | 1.8 |  |  |
| Calcium Stearate |  | 2 |  |
| Magnesium Naphthenate |  |  | 2 |

CUT RATE GROWTH

|  | Mils/1000 Flexes | | |
|---|---|---|---|
| Minutes Cure at 141° C.: |  |  |  |
| Unaged, 60 | 13 | 10 | 10 |
| Aged 24 hrs. at 100° C., 60 | 33 | 26 | 22 |
| 60 Minute Cure at 141° C.: |  |  |  |
| Unaged—Modulus at 200% | 525 | 375 | 325 |
| Unaged—Tensile Strength, lbs./sq. in. | 3,475 | 3,200 | 3,300 |
| Unaged—Elongation, percent | 650 | 700 | 750 |
| Aged—Modulus at 200% | 1,125 | 900 | 875 |
| Aged—Tensile Strength, lbs./sq. in. | 2,925 | 2,975 | 2,825 |
| Aged—Elongation, percent | 410 | 480 | 480 |

EXAMPLE 5

Example 4 was repeated substituting rosin which had been treated with calcium and magnesia hydroxide for the calcium and magnesium salts of fatty acids. The formulation and physical properties are shown in Table VIII.

Table VIII

|  | Compounds | | | |
|---|---|---|---|---|
|  | L | M | N | O |
| GR-S | 100 | 100 | 100 | 100 |
| EPC Black | 50 | 50 | 50 | 50 |
| Zinc Oxide | 5 | 5 | 5 | 5 |
| Sulfur | 2 | 2 | 2 | 2 |
| Softener (Petroleum Hydrocarbon) | 10 | 7 | 7 | 7 |
| F. F. Wood Rosin |  | 3 |  |  |
| Limed Wood Rosin (4.75%) (Ca(OH)₂) |  |  | 3 |  |
| Wood Rosin Containing (5% MgO) |  |  |  | 3 |
| OMBT | 0.495 | 0.495 | 0.495 | 0.495 |
| DOTG | 0.705 | 0.705 | 0.705 | 0.705 |
| Set-up Tests | Williams 3 min. "Y" at 100° C. inches | | | |
| No Heat | .117 | .117 | .118 | .117 |
| After 2.5 hrs. in Boiling H₂O | .142 | .131 | .131 | .130 |
| Per Cent Change | +21 | +12 | +11 | +11 |

CUT RATE GROWTH

|  | Mils/1000 Flexes | | | |
|---|---|---|---|---|
|  | L | M | N | O |
| 60 Minute Cure at 141° C., Unaged | 14 | 8 | 6 | 5 |
| Aged 24 hrs. at 100° C. | 31 | 21 | 16 | 14 |

I claim:

1. A method of reducing the cut-growth rate of flexible, vulcanized, rubber-like butadiene-styrene copolymer compositions obtained by vulcanizing a composition comprising an unvulcanized, vulcanizable, rubber-like butadiene-styrene copolymer, sulfur, an organic accelerator and zinc oxide in amount sufficient to fully activate the organic accelerator; which method comprises forming a composition of said unvulcanized, vulcanizable butadiene-styrene copolymer, sulfur, organic accelerator, and zinc oxide, adding thereto from 0.1–0.6% by weight of the polymer of a substance selected from the group consisting of the oxides of calcium and magnesium mechanically working said composition until the components thereof are substantially uniformly disseminated therein, and then subjecting the composition to vulcanization.

2. A composition vulcanizable to a flexible vulcanizate characterized by a low cut-growth rate, which composition comprises an unvulcanized, vulcanizable rubber-like butadiene-styrene copolymer, sulfur, an organic vulcanization accelerator, zinc oxide, said zinc oxide being present in amount sufficient to fully activate said organic accelerator, and from 0.1–0.6% by weight of the polymer of a substance selected from the group consisting of the oxides of calcium and magnesium.

3. A flexible vulcanizate prepared by vulcanizing a composition comprising an unvulcanized, vulcanizable rubber-like butadiene-styrene copolymer, sulfur, an organic vulcanization accelerator, zinc oxide, said zinc oxide being present in amount sufficient to fully activate said organic accelerator, and from 0.1–0.6% by weight of the polymer of a substance selected from the group consisting of the oxides of calcium and magnesium, said vulcanizate being characterized by a low cut-growth rate and in having tortional hysteresis characteristics differing inappreciably from the tortional hysteresis characteristics of a similar vulcanizate from which the oxides of calcium and magnesium are omitted.

ARNOLD R. DAVIS.

REFERENCES CITED

The following references are of record in the file of this patent:

UNITED STATES PATENTS

| Number | Name | Date |
|---|---|---|
| 2,287,774 | Bacon | June 30, 1942 |
| 2,395,506 | Sauser | Feb. 26, 1946 |

OTHER REFERENCES

Pages 9, 41 and 43, The Compounding of Buna S, Report No. 42-4 Dec. 1942, published by E. I. du Pont de Nemours & Co., Wilmington, Del. (Copy in Div. 50.)